United States Patent [19]

Johnson et al.

[11] Patent Number: 4,733,494

[45] Date of Patent: Mar. 29, 1988

[54] ANIMAL TRAP

[76] Inventors: Oscar F. Johnson, Rte. 12, McIntosh, Minn. 56556; Frandell O. Johnson, Box 292, Greenbush, Minn. 56726

[21] Appl. No.: 58,517

[22] Filed: Jun. 5, 1987

[51] Int. Cl.$^4$ ............................................. A01M 23/26
[52] U.S. Cl. ........................................... 43/85; 43/91; 43/94
[58] Field of Search ........................... 43/85, 91, 94, 80

[56] References Cited

U.S. PATENT DOCUMENTS

| | | |
|---|---|---|
| 975,098 | 11/1910 | Wyman . |
| 1,029,992 | 6/1912 | Harrington . |
| 1,135,626 | 4/1915 | Schreck ................................. 43/94 |
| 1,146,106 | 7/1915 | Schmidt . |
| 1,190,508 | 7/1916 | Brown . |
| 1,296,407 | 3/1919 | Layton ................................. 43/88 |
| 1,442,385 | 1/1923 | Cratty ................................... 43/90 |
| 1,492,788 | 5/1924 | Gangwisch ........................... 43/94 |
| 1,881,871 | 10/1932 | Nerby . |
| 1,998,521 | 4/1935 | Pickering ............................. 43/85 |
| 2,042,728 | 6/1936 | Neville ................................. 43/85 |
| 2,231,984 | 2/1941 | Anderson . |
| 2,680,323 | 6/1954 | Shaw . |
| 3,057,111 | 10/1962 | Beaulieu . |
| 3,529,377 | 9/1970 | Anderson ............................. 43/91 |
| 4,109,407 | 8/1978 | Johnson ............................... 43/91 |

Primary Examiner—Gene P. Crosby
Attorney, Agent, or Firm—Burd, Bartz & Gutenkauf

[57] ABSTRACT

An animal trap having a pair of elongated rods joined to jaws that are bias to a closed position with a coil spring. The coil spring is concentrically located about a pivot pin that pivotally joins the mid-sections of the rods together. An over-centered toggle trip mechanism is pivotally connected to the rods to hold the jaws in their open position. The trip mechanism has a trigger operable by the animal to be trapped to move the over-center toggle trip mechanism to a position wherein it collapses whereby the spring biases the jaws to their closed positions.

20 Claims, 8 Drawing Figures

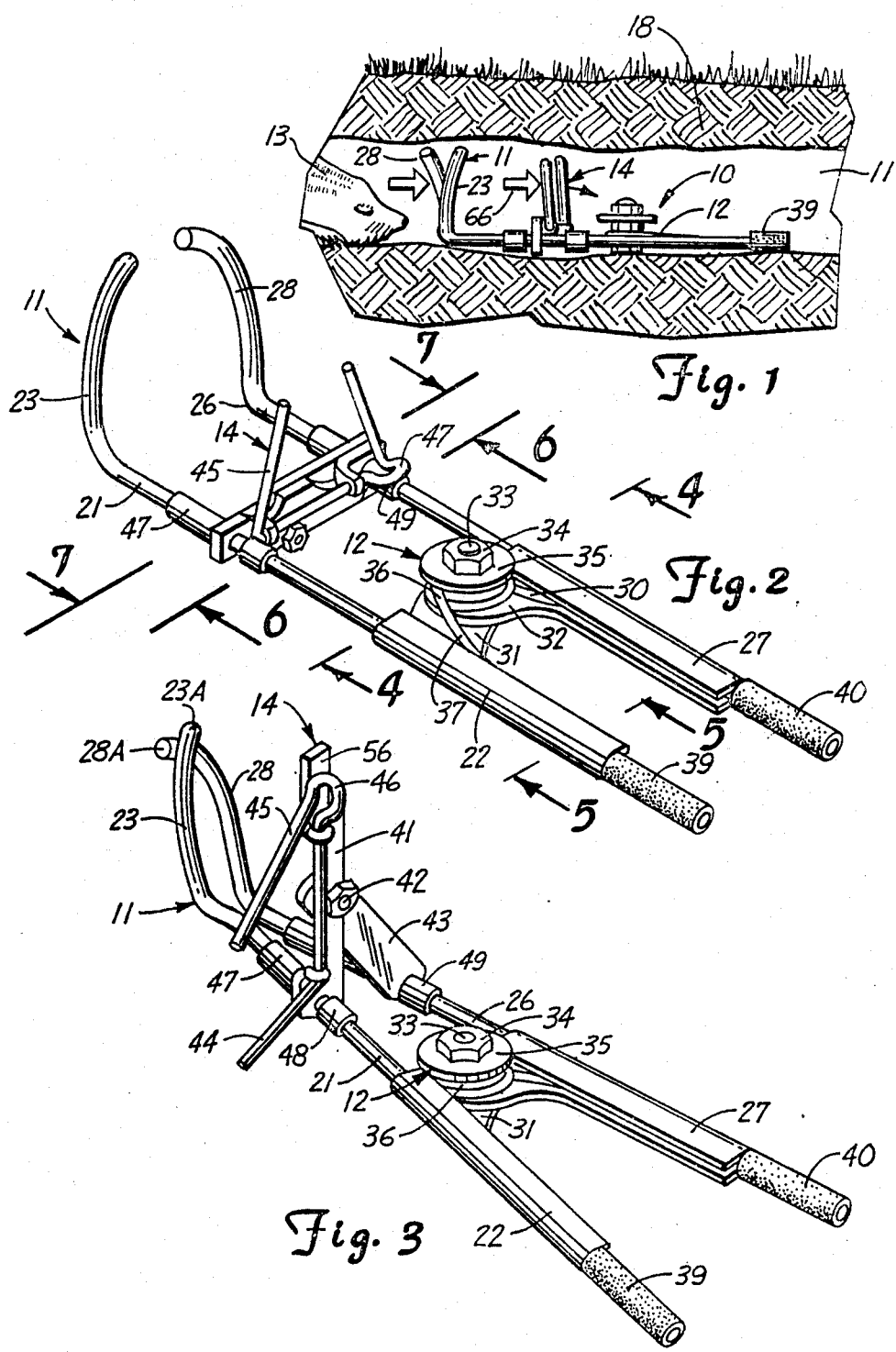

ANIMAL TRAP

FIELD OF INVENTION

The invention relates to animal traps having animal holding members that are biased to closed positions when a trigger mechanism is released.

BACKGROUND OF INVENTION

Spring operated animal traps having movable jaws are used to trap a variety of wild animals. Examples of spring biased traps are disclosed by Harrington in U.S. Pat. No. 1,029,992 and Beaulieu of U.S. Pat. No. 3,057,111. These traps have centrally located trigger mechanisms and springs which close pair of jaws when the trigger mechanism is released. These types of traps are operable to catch and hold the foot of an animal. In the event the animal escapes from the trap, there is considerable damage to the foot of the animal. These types of traps do not kill the animal so that the animal is subjected to considerable pain until the trapper services the trap.

Cratty in U.S. Pat. No. 1,442,385 discloses a trap operable to engage and hold an animal by contact with its body to insure against the animal releasing himself by gnawing off its foot or leg. This trap has two pairs of pivoted jaws that are actuated by separate coil springs. A centrally located treadle and holding mechanism is used to releasably hold the trap in its set position. A similar trap is shown by Layton in U.S. Pat. No. 1,296,407.

Johnson, in U.S. Pat. No. 4,109,407 describes an animal trap having a pair of arcuate red-shaped jaw members that are biased to a closed position with a spring. This trap includes a trigger mechanism to hold the jaws in their open position. When the animal trips the trigger mechanism, the spring closes the jaws so as to apply a strong pressure to the body cavity of the animal.

SUMMARY OF INVENTION

This invention is directed to a trap useable in underground tunnels for catching small animals, such as gophers, moles, shrews, wood chucks, muskrats, beavers, and the like. The trap is a portable animal holding apparatus having jaws that are biased to a closed position with a spring. A trigger mechanism is operable to hold the jaws in their open or set position. When the trigger mechanism is released the spring moves the jaws toward each other to close the trap.

The trap comprises an animal holding structure having a first rod with a first jaw attached thereto. A second rod is located adjacent to the first rod and has a second jaw attached thereto. The first and second jaw are in general transverse alignment. The jaws are outwardly curved arcuate bar members. The rods are pivotally mounted together so that the jaws are movable relative to each other between an open position and a closed position. A coil torsion spring engages the rods to bias the first jaw to the closed position adjacent the second jaw. The spring is positioned concentrically about an upright post which extends through a pair of inwardly directed plates attached to the rods. A trigger mechanism is used to hold the jaw in the open position against the biasing force of the spring. The trigger mechanism has over center release members or toggle linkage pivotally mounted on the first and second rods. The toggle linkage has a first arm pivotally mounted on the first rod member and a second rod member pivotally mounted on the second rod member. The arms extend between the rods and are pivotally connected with a pivot pin. One arm has a stop finger that engages a rod to limit the down over-center location of the pivot pin between the rods. As long as the pivot pin is in the over-center position the trap will remain in the open or set position. A trigger finger is movably attached to one of the arms. The toggle linkage is released when the trigger finger is moved from a set position by an animal. Trigger finger pivots the arms in an upward direction. When the pivot pin moves up over-center or through the plane extended through the longitudinal axis of the rods, the spring moves the jaws to the closed position to trap and quickly hold the animal between the jaws.

DESCRIPTION OF DRAWING

FIG. 1 is a side elevational view of the animal trap of the invention located in an underground tunnel for use in catching gophers, moles, or like animals running in the tunnel;

FIG. 2 is an enlarged perspective view of the trap in the set position;

FIG. 3 is a perspective view of the trap in a closed position;

DESCRIPTION OF PREFERRED EMBODIMENT

Figure 4:
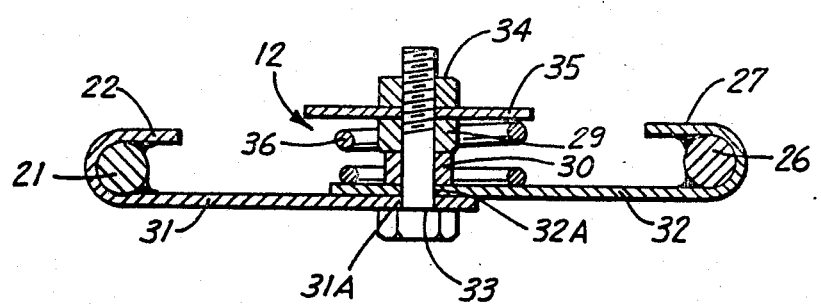
FIG. 4 is an enlarged sectional view taken along the line 4—4 of FIG. 2.

Referring to FIGS. 1 to 3 of the drawing, there is shown an animal trap, indicated generally at 10 for use in catching gophers, moles, and similar small animals. Preferably, the trap is used in an underground tunnel or runway 17 located below the surface of the ground 18 to catch a gopher 13 or like small animals. Trap 10 has a movable animal holding structure indicated generally at 11 operatively associated with a biasing means 12 which functions to close the holding means when animal 13 engages and trips a trigger mechanism indicated generally at 14. Trigger mechanism 14 cooperates with holding structure 11 to hold it in an open or set position against the force of biasing means 12. The animal 13 running along tunnel 17 will move between the holding structure 11 and engage and release the trip mechanism 14. The biasing means 12 will then close the holding structure 11 and thereby restrain animal 13 from continuing to move along tunnel 17.

Animal holding structure 11 comprises a first elongated generally linear rod 21 having a portion extend through a generally U-shaped member or sleeve 22. Rod 21 extends longitudinally in a forward direction from sleeve 22 and is integral with an upright generally concave or arcuate jaw 23. Located adjacent one side of first rod 21 is a second elongated rod 26. Rod 26 has a portion secured to a generally U-shaped member or sleeve 27. The open side of sleeve 27 is directed toward the first rod 21 and the open side of sleeve 22. Second rod 27 extends longitudinal in a forward direction from sleeve 27 and is integral with an upright arcuate or concave curved jaw 28. The jaws 23 and 28 normally extend in an upward direction and arcuately curve toward each other as shown in FIG. 2. Jaws 23 and 28 are in general transverse alignment with each other and project upwardly generally normal to the longitudinal axes of rods 21 and 26. The outer or upper ends of the jaws 23 and 28 are curved in opposite directions as shown in FIG. 1 so that the ends of the jaws 23 and 28 do not hit each other when the jaws are in their closed or holding position as shown in FIG. 3. When the jaws 23 and 28 are in their closed position, they will grip opposite sides of the animal to hold the animal. Hand grips 39 and 40 are provided on the ends of rods 21 and 23 and are remote from jaws 23 and 28. Grips 39 and 40 are tubular sleeves located about the ends of rods 21 and 26. Sleeves can be metal, plastic, or rubber tubes or a plastic coating material applied to the ends of rods 21 and 26.

Returning to FIGS. 2, 3, and 4, sleeve 22 has an inwardly directed lower flange or plate 31 having a rounded outer edge. Plate 31 extends laterally from the lower inner edge of sleeve 22 adjacent the bottom of first rod 21. Sleeve 27 has an inwardly directed flange or plate 32 with a rounded outer edge. Plate 32 is identical to plate 31. Plates 31 and 32 project in opposite directions toward each other. Plate 32 extends laterally from the lower inner edge of sleeve 27 adjacent the bottom of second rod 26 and overlaps plate 31. As shown in FIG. 4, the overlapped plates 31 and 32 have aligned holes 31A and 32A that accommodate a fastening pivot means, such as an upright bolt 33 accommodating a threaded nut 34, to pivotally mount first rod 21 on second rod 26 for pivotal movement about a normally upright axis.

Figure 5:
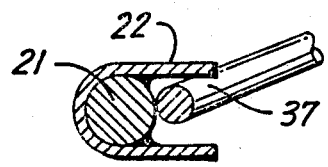
FIG. 5 is an enlarged sectional view taken along the line 5—5 of FIG. 2.

Biasing means 12 comprises a coil torsion spring 36 having a number of turns concentrically located about the body or shaft to bolt 33. Spring 36 has an elongated first end 37 bearing against the inner side of first rod 21. As shown in FIG. 5, spring end 37 is located in the groove or channel formed by the U-shaped member 22 and bears against the inside of rod 21. The opposite end of spring 36 has an elongated spring end 38 that bears against the inside of second rod 26. Spring end 36 is located in the groove formed by the U-shaped member 27 to retain spring end 38 in engagement with rod 26. Spring 36 biases jaws 23 and 28 toward each other and ends of rods 21 and 26 opposite jaws 23 and 28 away from each other. Under the biasing force of spring 36, the forward ends of rods 21 and 26 attached to jaws 23 and 28 pivot toward each other to bring the jaws to a closed or tripped position as shown in FIG. 3. The outer ends of jaws 23A and 28A overlap each other so that the intermediate arcuate portions of jaws 23 and 28 are located relatively close to each other when the jaws 23 and 28 are in closed positions.

As shown in FIG. 4, bolt 33 extends upwardly through centrally located aligned holes 31A and 32A in plates 31 and 32 respectively. The head of bolt 33 engages the bottom of plate 31. A first nut 29 threaded on the upper end of bolt 33 holds a cylindrical ring or spacer 30 between the top of plate 32 and the bottom of nut 29. Spring 36 is concentrically positioned about ring 30 and nut 29. A washer 35 located over spring 36 on the bolt 33 retains the spring in operative assembled relation with bolt 33. A second nut 34 threaded onto outer end of bolt 33 fixes the position of the washer 35 against nut 29. The diameter of washer 35 is large enough to prevent spring 36 from sliding off of bolt 33 and limit the vertical movement of spring 36. Nut 29 and 34 are threaded on bolt 33 so to allow plates 31 and 32 to freely pivot about the bolt 33. The bolt 33 is located in a generally upright plane adjacent the mid-sections of rods 21 and 26.

Figure 6:
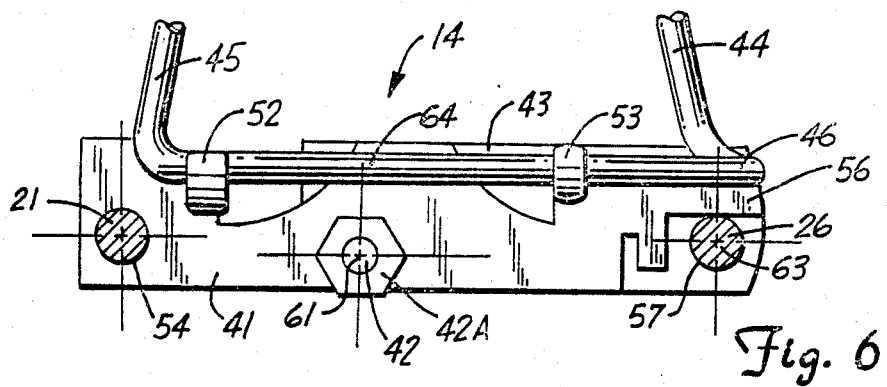
FIG. 6 is an enlarged sectional view taken along the line 6—6 of FIG. 2.
Figure 7:
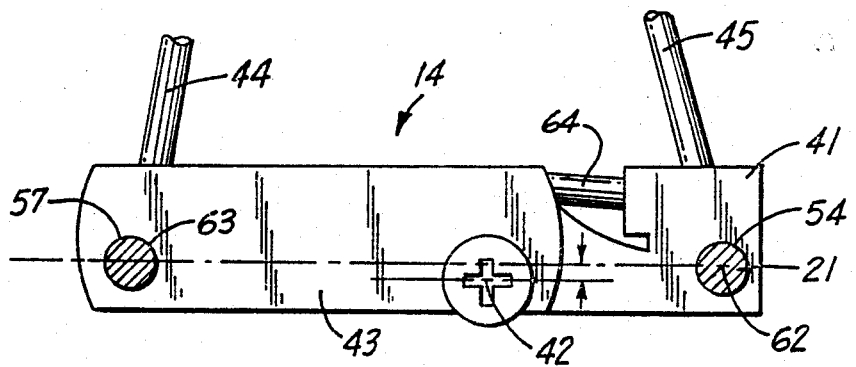
FIG. 7 is an enlarged sectional view taken along the line 7—7 of FIG. 2.
Figure 8:
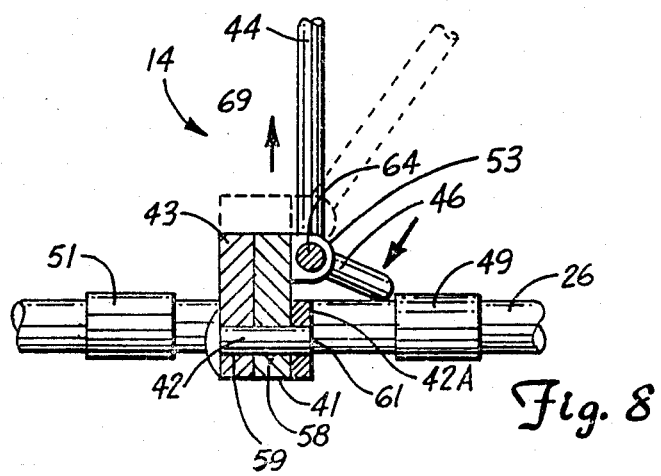
FIG. 8 is an enlarged sectional view illustrating trigger actuation of the animal trap.

Trigger mechanism 14, as shown in FIGS. 6 to 8, has a first arm 41 pivotally mounted on rod 21. The outer end of arm 41 has a hole 54 accommodating rod 21. The inner end of arm 41 has a stop or finger 56 adapted to be located in contact with upper surface of rod 26, as shown in FIG. 6, when the trap is in its open or shut position. Finger 56 moves upwardly away from rod 26 when arm 41 pivots upwardly on rod 21 during the time the trap is biased to its closed or tripped position. A second arm 43 is located adjacent the side of first arm 41. Second arm 43 has a hole 57 in one end thereof accommodating rod 26. Arm 43 pivots about the axis of rod 26 in an upward direction when the trap is moving to its closed position. First and second arms 41 and 43 have aligned holes 58 and 59 as shown in FIG. 8. A pivot bolt 42 extends through holes 58 and 59 and is secured thereto with a conventional nut 42A. Other types of pivot members, such as rivets, pins, and the like, can be used to pivotally connect arms 41 and 43 together. Arms 41 and 42 and bolt 42 comprise a toggle linkage that releasably holds the rods 21 and 26 and jaws 23 and 28 attached thereto in the open or set position. The longitudinal axis 61 of pivot bolt 42 is located below the horizontal plane passing through the longitudinal axes 62 and 63 of the rods 21 and 26 respectively. As shown in FIGS. 6 and 7, axis 61 and pivot bolt 42 is located a distance X below the horizontal plane passing through axes 62 and 63 when the trap is in the set or open position.

As seen in FIGS. 2 and 3, arm 41 is longitudinally located between a pair of spacer sleeves or rings 47 and 48 mounted on rod 21. Arm 43 is positioned on rod 26 between spacer sleeves 49 and 51. The spacer sleeves 47, 48, 49, and 51 locate the tripped mechanism 41 about midway between the holding structure 11 and the biasing means 12.

Trip mechanism 14 has a pair of trigger fingers 44 and 45 that extend upwardly from arm 41. As seen in FIG. 2, the trip fingers 44 and 45 converge upwardly toward each other and are located inwardly of the longitudinal extent or planes of jaws 23 and 28. Finger 45 is joined to a horizontal member or rod 64 that terminates in an outwardly directed loop or crank portion 46 that is joined to the bottom of trip finger 44. As seen in FIG. 8, loop 46 is adjacent the top of rod 26 when trip mechanism 14 is in its set position. Rod 64 is journaled in a pair of loops or eyes 52 and 53 secured to the upper portions of arm 41. Loops 52 and 53 can be tabs with holes bent normal to arm 41. The rod 64 is rotatably mounted on loops 52 and 53 for rotation about a generally transverse axis when the trip mechanism 14 is in the set position.

In use, when trap 10 is in the set position, jaws 23 and 28 are located in an upright position facing the direction of movement of animal 13 in tunnel 17 as seen in FIG. 1. The trip fingers 44 and 45 are located in upright positions behind jaws 23 and 28. Jaws 23 and 28 are retained in their open or apart positions by trip mechanism 14. The arms 41 and 43 are located in their side-by-side positions with pivot bolt 43 located below the center line or below the horizontal plane passing through the axes 62 and 63 of rods 21 and 26 as seen in FIGS. 6 to 8. Spring 36 moves arms 41 and 43 in a transverse direction toward each other to retain pivot bolt 42 in its down below center position. This holds the trap in its set position. Returning to FIG. 1, when animal 13 is running in the direction of arrow 66 she will move between open jaws 23 and 28 and engage the upright trigger fingers 44 and 45.

Continued forward movement of animal 13 will pivot trigger fingers 44 and 45 in a forward direction as indicated by arrow 67. This moves loop 46 down into engagement with rod 26 as indicated by arrow 68 in FIG. 8. The lever 41 will then be pivoted in an upward direction as indicated by arrow 69. This raises the pivot axis 61 of the pivot bolt 62 above the horizontal plane passing through the axis 62 and 63 of rods 21 and 26 respectively. The spring 36 will then quickly break the toggle linkage 41 and 43 to its folded position as shown in FIG. 3. Jaws 23 and 28 then restrain the animal in the trap. The trap 10 is then removed from the tunnel 17 for appropriate treatment of the captured animal 13.

While there has been shown and described a preferred embodiment of the trap including its holding jaws and trigger mechanism, it is understood that changes of the structure, materials, arrangement of structure may be made by those skilled in the art without departing from the invention. The invention is defined in the following claims.

The embodiments of the invention in which an exclusive property or privilege is claimed are defined as follows:

1. An animal trap comprising: animal holding means having a first rod, first animal holding jaw attached to the first rod, a second rod located adjacent the first rod, second animal holding jaw attached to the second rod and located in general transverse alignment with the first jaw, means pivotally mounting the first rod to the second rod whereby the first and second jaws are movable relative to each other between an open position and a closed position, coil spring means located adjacent a portion of the means pivotally mounting the first rod to the second rod, said coil spring means cooperating with the first and second rods to bias the first and second jaws to the closed position, and a trigger mechanism for holding the first and second jaws in the open position against the force of the spring means, said trigger mechanism having an over center release means pivotally mounted on the first and second rods, and trip finger means pivotally mounted on the release means for movement between a set position and a trip position, said release means being released when the finger means is moved from the set position to the release position by an animal whereby the spring means moves the first and second jaws to the closed position to trap the animal between the first and second jaws.

2. The trap of claim 1 wherein: the coil spring means includes a coil torsion spring positioned concentrically about a portion of the means pivotally mounting the first rod to the second rod.

3. The animal trap of claim 2 wherein: the coil torsion spring has a first end located in engagement with the first rod and a second end located in engagement with the second rod.

4. The trap of claim 1 wherein: the means pivotally mounting the first rod to the second rod includes a normally upright pivot member located between said first and second rods, said spring means comprising a coil torsion spring located about the pivot member, said coil spring having a first end located in engagement with the first rod and a second end located in engagement with the second rod to pivot the first and second rods about the pivot member to bias the first and second jaws to the closed position, and means to retain the first end of the spring in engagement with the first rod and the second end of the spring in engagement with the second rod.

5. The trap of claim 4 wherein: the means to retain the first and second ends of the spring in engagement with the first and second rods includes a first U-shaped member mounted on said first rod, said first U-shaped member having a first groove accommodating the first end of the spring to hold the first end of the spring adjacent the first rod, a second U-shaped member mounted on said second rod, said second U-shaped member having a second groove accommodating the second end of the spring to hold the second end of the spring adjacent the second rod.

6. The trap of claim 5 wherein: said first U-shaped member has a first flange extended from the first rod toward the second rod, said second U-shaped member has a second flange extended from the second rod toward the first rod adjacent the first flange, said first and second flanges having aligned holes accommodating said pivot member.

7. The animal trap of claim 1 wherein: each jaw is a normally upright and outwardly curved bar joined to an end of a rod.

8. The animal trap of claim 1 wherein: the means pivotally mounting the first rod to the second rod comprises a pair of inwardly directed overlapping plates, one plate being centrally connected to the first rod, the other plate being centrally connected to the second rod opposite the one plate, said plates having aligned holes, and an upright pivot pin extending through the aligned holes in the plates whereby the first and second rods are pivotally mounted with respect to the pin.

9. The animal trap of claim 8 wherein: the coil spring means includes a coil torsion spring positioned concentrically about the pin.

10. The animal trap of claim 9 including: generally U-shaped elongated sleeves mounted on the first and second rods, said coil torsion spring having ends located in said sleeves in engagement with the rods.

11. The animal trap of claim 1 wherein: the trap finger means includes a U-shaped rod pivotally mounted to the over-center release means.

12. The animal trap of claim 1 wherein: the over center release means includes a first arm having one end pivotally mounted on the first rod, a second arm having a first end pivotally mounted on the first rod, and the first arm having a second end engageable with the second rod when the trap is in the set position, and pivot means connecting the first arm to the second arm.

13. The animal trap of claim 12 wherein: the trip finger means has a loop means engageable with the second rod when the trip finger means is moved from the set position toward the release position whereby the first arm is pivoted with respect to the first rod and the second arm and the over center release means is released by moving the pivot means above its overcenter position.

14. The animal trap of claim 13 wherein: the trip finger means includes a transverse rod having at least one upright projection.

15. An animal trap comprising: an elongated linear first rod having an end, first animal holding jaw attached to the end of the first rod and extended generally normal therefrom, an elongated linear second rod laterally spaced from the first rod having an end, second animal holding jaw joined to the end of the second rod and extended generally normal thereto, said first and second animal holding jaws being laterally spaced from each other, means pivotally mounting the first rod to the second rod for pivotal movement about an axis generally normal to the longitudinal extent of said first and second rods, said means pivotally mounting the first rod and second rod including a first plate joined to the first rod and a second plate joined to the second rod, said first and second plates having overlapped portions, said overlapped portions having aligned holes, a pivot pin extended through said holes located between first and second rods, spring means located around said pivot pin, said spring means having a first end engageable with the first rod remote from said jaws, and a second end engageable with the second rod remote from said jaws whereby the spring means biases the first and second arms to move the jaws to a closed position, a trigger mechanism operatively connected to said arms between said pivot pin and said jaws to hold the first and second jaws in the open position against the force of the spring means, said trigger mechanism having an overcenter toggle linkage including a first arm pivotally mounted on the first rod and a second arm pivotally mounted on the second rod, pivot means pivotally connecting the first arm with the second arm, said first arm having a stop engageable with the second rod to hold the pivot means in a down off-center position thereby holding the rods in an apart set position, said trigger mechanism including trip finger means pivotally mounted on one of said arms, said finger means having a member engageable with a rod on movement of the finger means from a set position to a release position whereby the spring means moves the first and second jaws to a closed position to trap the animal between the first and second jaws.

16. The trap of claim 15 including: a first generally U-shaped member mounted on the first rod, said first U-shaped member having a first groove accommodating a first end of the spring to hold the first end of the spring adjacent the first rod, and a second generally U-shaped member mounted on the second rod, said second U-shaped member having a second groove accommodating the second end of the spring to hold the second end of the spring adjacent the second rod.

17. The trap of claim 16 wherein: said first plate is a flange of said U-shaped member, said second plate is a flange of said second U-shaped member, and said flanges having said aligned holes for accommodating the pivot pin.

18. The trap of claim 15 wherein: said finger means includes a plurality of normally upwardly directed fingers.

19. The trap of claim 15 wherein: said finger means has a generally transverse rod pivoted to said first arm and generally upright fingers secured to said transverse rod and a downwardly extended member secured to said rod and the downwardly extended member being engageable with the second rod on movement of the finger from a generally upright set position to a trip position thereby moving the pivot means from its offset position so that the toggle link folds under the biasing force of the spring to close the jaws.

20. The trap of claim 15 wherein: each jaw is a normally upright and outwardly curved bar.

* * * * *